United States Patent
Mangold

(10) Patent No.: US 8,386,650 B2
(45) Date of Patent: Feb. 26, 2013

(54) METHOD TO IMPROVE A SOLID STATE DISK PERFORMANCE BY USING A PROGRAMMABLE BUS ARBITER

(75) Inventor: Richard P. Mangold, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 12/639,700

(22) Filed: Dec. 16, 2009

(65) Prior Publication Data

US 2011/0145478 A1   Jun. 16, 2011

(51) Int. Cl.
*G05F 3/00* (2006.01)
*G06F 13/00* (2006.01)

(52) U.S. Cl. ............ 710/5; 710/8; 710/15; 710/31; 710/36

(58) Field of Classification Search ............ None
See application file for complete search history.

(56) References Cited

U.S. PATENT DOCUMENTS

| | | |
|---|---|---|
| 2006/0152981 A1 | 7/2006 | Ryu |
| 2009/0031073 A1 | 1/2009 | Diggs et al. |
| 2009/0080299 A1* | 3/2009 | Chen et al. ............ 369/47.15 |
| 2009/0217111 A1* | 8/2009 | Ito ............................ 714/718 |
| 2009/0327583 A1 | 12/2009 | Simonson |
| 2010/0199033 A1* | 8/2010 | Nguyen et al. ............ 711/104 |

OTHER PUBLICATIONS

Intel X18M/X25-M Sata SSD Product Manual, May 2009, Intel, [online, accessed on Oct. 1, 2011], URL: http://download.intel.com/design/flash/nand/mainstream/mainstream-sata-ssd-datasheet.pdf.*
Combined Search Report and Examination Report received for United Kingdom Patent Application No. 1018762.3, mailed on Feb. 23, 2011, 5 pages.

* cited by examiner

*Primary Examiner* — Scott Sun
(74) *Attorney, Agent, or Firm* — Chapin IP Law, LLC

(57) ABSTRACT

A method to improve a solid state disk performance by using a programmable bus arbiter is generally presented. In this regard, in one embodiment, a method is introduced comprising delaying a request from a solid state drive for access to an interface for a time to allow a host to access the interface to transmit a command to the solid state drive. Other embodiments are described and claimed.

19 Claims, 2 Drawing Sheets

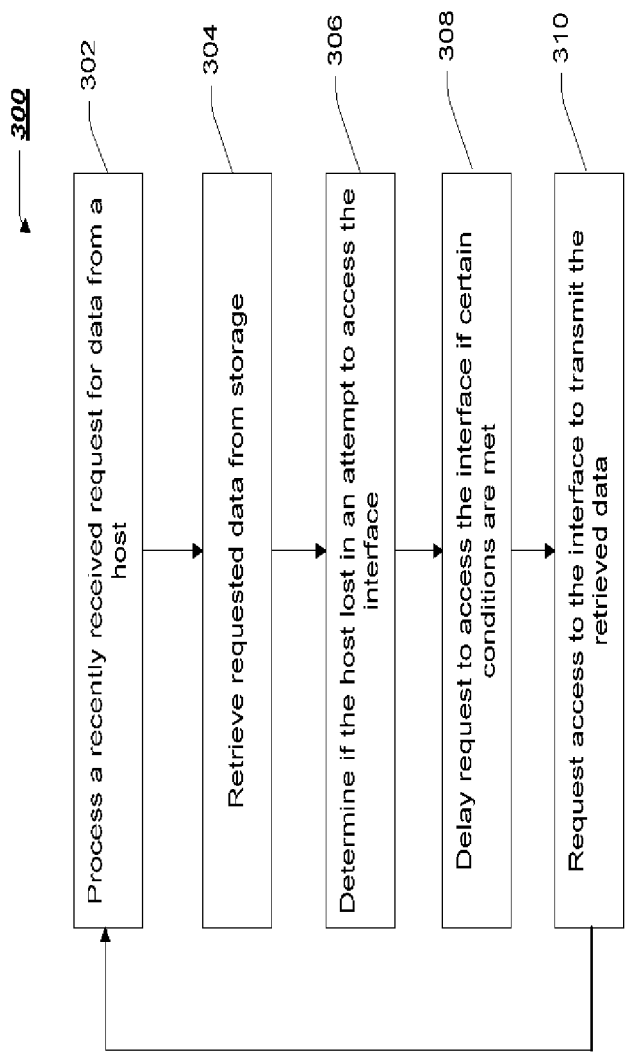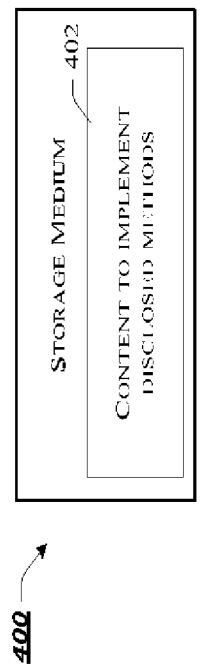

METHOD TO IMPROVE A SOLID STATE DISK PERFORMANCE BY USING A PROGRAMMABLE BUS ARBITER

FIELD OF THE INVENTION

Embodiments of the present invention generally relate to the field of data storage, and, more particularly to a method to improve a solid state disk performance by using a programmable bus arbiter.

BACKGROUND OF THE INVENTION

Modern solid state disk (SSD) drives have such high performance that they can saturate an interface, such as a serial advanced technology attachment (SATA) interface, in a very bursty manor. Because of these large bursts of data, new commands from a host can be prevented from being sent to the SSD until the SSD goes idle for some length of time. As a result, a SSD might not be able to utilize the full concurrency of the NAND devices under deeply queued workloads. New commands to the SSD may be blocked for several hundred microseconds, because the SSD is likely to win SATA bus arbitration while it has data ready to be sent to the host. This is not an issue on normal rotating disk drives because they can not fetch data for multiple commands in parallel. However, on SSD's, this can prevent the full utilization of multiple concurrent NAND channels.

BRIEF DESCRIPTION OF THE DRAWINGS

The present invention is illustrated by way of example and not limitation in the figures of the accompanying drawings in which like references indicate similar elements, and in which:

FIG. 3 is a flow chart of an example method to improve a solid state disk performance by using a programmable bus arbiter, in accordance with one example embodiment of the invention; and FIG. 4 is a block diagram of an example article of manufacture including content which, when accessed by a device, causes the device to implement one or more aspects of one or more embodiment(s) of the invention.

DETAILED DESCRIPTION

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
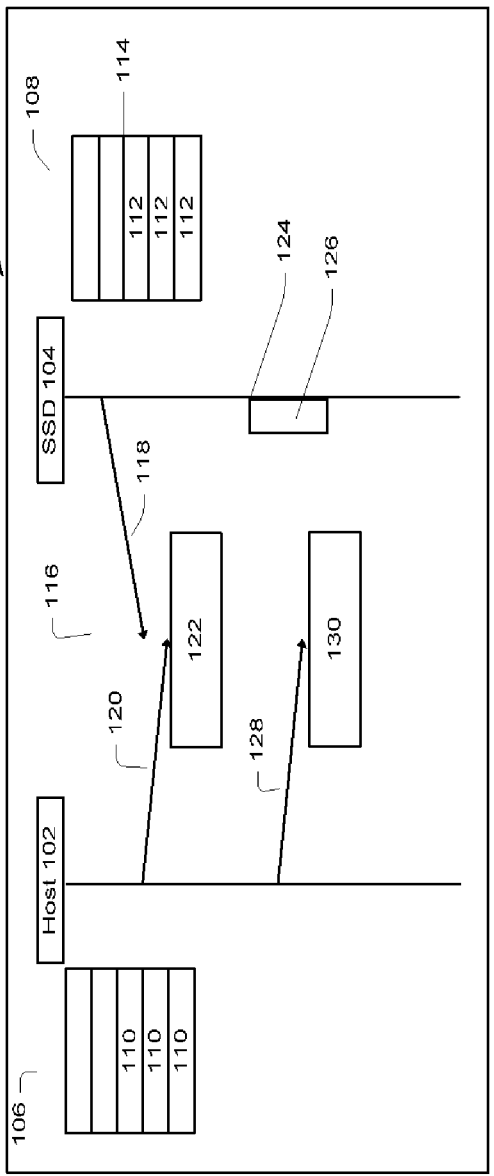
FIG. 1 is a graphical illustration of an example solid state disk and host interface, in accordance with one example embodiment of the invention.

FIG. 1 is a graphical illustration of an example solid state disk and host interface, in accordance with one example embodiment of the invention. In accordance with the illustrated example embodiment, system 100 may include a host 102 and a solid state disk (SSD) 104 that communicate over and compete for access to interface 116. Host 102 may include host queue 106 to store pending commands 110, for example read requests, to be sent to SSD 104 when host 102 is able to access interface 116. SSD 104 may include disk queue 108 to store results 112, for example read completions, to be sent to host 102 when SSD 104 is able to access interface 116.

Host 102 and SSD 104 may arbitrate for access to interface 116. In one embodiment, where SSD 104 submits access request 118 before host 102 submits access request 120, SSD 104 will have access to interface 116 for access time 122 to transmit a stored result 112. When SSD 104 is finished transmitting after access time 122, SSD 104 may be ready to submit another access request at time 124. However, as part of a method to improve a solid state disk performance by using a programmable bus arbiter, as described hereinafter in reference to FIG. 3, SSD 104 may instead delay a request to access interface 116 for a delay time 126 to allow host 102 to submit access request 128 and to transmit a command 110 to SSD 104 over interface 116 during access time 130.

Delay time 126 may be introduced periodically or only when certain conditions are satisfied. In one embodiment delay time 126 is introduced to delay SSD 104 from requesting access to interface 116 if it is detected that host 102 lost to SSD 104 in an attempt to access interface 116, for example the case of access request 120. In one embodiment, delay time 126 is only introduced if there are fewer than threshold 114 results 112 stored in disk queue 108, for example when it would be beneficial to allow host 102 to submit additional commands 110. Other methods or conditions for when to introduce delay time 126 may occur to one skilled in the art and are considered part of the spirit of embodiments of the invention. In one embodiment, delay time 126 comprises about 1 microsecond.

Figure 2:
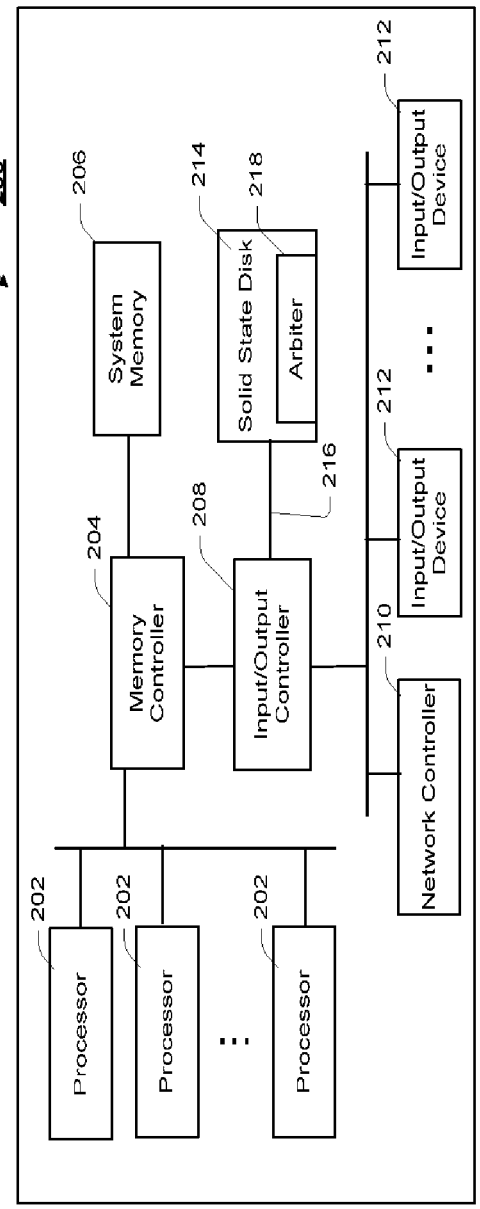
FIG. 2 is a block diagram of an example electronic appliance suitable for implementing disclosed methods, in accordance with one example embodiment of the invention.

FIG. 2 is a block diagram of an example electronic appliance suitable for implementing disclosed methods, in accordance with one example embodiment of the invention. Electronic appliance 200 is intended to represent any of a wide variety of traditional and non-traditional electronic appliances, laptops, desktops, cell phones, wireless communication subscriber units, wireless communication telephony infrastructure elements, personal digital assistants, set-top boxes, or any electric appliance that would benefit from the teachings of the present invention. In accordance with the illustrated example embodiment, electronic appliance 200 may include one or more of processor(s) 202, memory controller 204, system memory 206, input/output controller 208, network controller 210, input/output device(s) 212, solid state disk 214, interconnect 216 and arbiter 218 coupled as shown in FIG. 2. In one embodiment, solid state disk 214 includes flash memory, such as NAND flash memory, and interacts with I/O controller 208 as SSD 104 interacts with host 102. In one embodiment, arbiter 218 may introduce a delay 126 in SSD interconnect access requests as part of a method to improve a solid state disk performance, as described in greater detail with reference to FIG. 3.

Processor(s) 202 may represent any of a wide variety of control logic including, but not limited to one or more of a microprocessor, a programmable logic device (PLD), programmable logic array (PLA), application specific integrated circuit (ASIC), a microcontroller, and the like, although the present invention is not limited in this respect. In one embodiment, processors(s) 202 are Intel® compatible processors. Processor(s) 202 may have an instruction set containing a plurality of machine level instructions that may be invoked, for example by an application or operating system.

Memory controller 204 may represent any type of chipset or control logic that interfaces system memory 206 with the other components of electronic appliance 200. In one embodiment, the connection between processor(s) 202 and memory controller 204 may be a point-to-point serial link. In another embodiment, memory controller 204 may be referred to as a north bridge.

System memory 206 may represent any type of memory device(s) used to store data and instructions that may have been or will be used by processor(s) 202. Typically, though the invention is not limited in this respect, system memory 206 will consist of dynamic random access memory (DRAM). In one embodiment, system memory 206 may consist of Rambus DRAM (RDRAM). In another embodiment, system memory 206 may consist of double data rate synchronous DRAM (DDRSDRAM).

Input/output (I/O) controller 208 may represent any type of chipset or control logic that interfaces I/O device(s) 212 with the other components of electronic appliance 200. In one embodiment, I/O controller 208 may be referred to as a south bridge. In another embodiment, I/O controller 208 may comply with the Peripheral Component Interconnect (PCI) Express™ Base Specification, Revision 1.0a, PCI Special Interest Group, released Apr. 15, 2003.

Network controller 210 may represent any type of device that allows electronic appliance 200 to communicate with other electronic appliances or devices. In one embodiment, network controller 210 may comply with a The Institute of Electrical and Electronics Engineers, Inc. (IEEE) 802.11b standard (approved Sep. 16, 1999, supplement to ANSI/IEEE Std 802.11, 1999 Edition). In another embodiment, network controller 210 may be an Ethernet network interface card.

Input/output (I/O) device(s) 212 may represent any type of device, peripheral or component that provides input to or processes output from electronic appliance 200.

Interconnect 216 is shown as coupling solid state disk 214 with I/O controller 208, however solid state disk 214 may be coupled to other components of electronic appliance 200. In one embodiment, interconnect 216 represents a Serial Advanced Technology Attachment (SATA) bus.

While shown as being part of solid state disk 214, arbiter 218 may be incorporated into another component of electronic appliance 200, such as I/O controller 208, for example. In one embodiment, arbiter 218 may be software or a combination of software and hardware. In one embodiment, arbiter 218 represents an operating system (OS) application.

FIG. 3 is a flow chart of an example method to improve a solid state disk performance by using a programmable bus arbiter, in accordance with one example embodiment of the invention. It will be readily apparent to those of ordinary skill in the art that although the following operations may be described as a sequential process, many of the operations may in fact be performed in parallel or concurrently. In addition, the order of the operations may be re-arranged without departing from the spirit of embodiments of the invention.

In one embodiment, method 300 begins with SSD 214 processing (302) a recently received request for data from I/O controller 208. In one example embodiment, a command 110 may include a virtual address for data to be read from flash memory.

Next, SSD 214 would retrieve (304) the requested data from the flash memory. In one embodiment, SSD 214 would store the results in disk queue 108.

Method 300 continues with arbiter 218 determining (306) if I/O controller 208 lost in an attempt to access interconnect 216. In one embodiment, arbiter 218 sets a flag or increments a counter if a losing access request 120 is detected.

Next, arbiter 218 may delay (308) a request by SSD 214 to access interconnect 216 if certain conditions are met. In one example embodiment, a delay time 126 is introduced if a losing access request 120 was detected. In one embodiment, arbiter 218 introduces delay time 126 if a formula based at least in part on the number of stored results 112 and/or a counter of losing access requests 120 indicates a delay would improve disk performance.

Then, method 300 may conclude with SSD 214 requesting (310) access to interconnect 216 to transmit retrieved data, for example a stored result 112.

FIG. 4 illustrates a block diagram of an example storage medium comprising content which, when accessed, causes an electronic appliance to implement one or more aspects of the disclosed method 300. In this regard, storage medium 400 includes content 402 (e.g., instructions, data, or any combination thereof) which, when executed, causes the appliance to implement one or more aspects of methods described above.

The machine-readable (storage) medium 400 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention may be used in a variety of applications. Although the present invention is not limited in this respect, the invention disclosed herein may be used in microcontrollers, general-purpose microprocessors, Digital Signal Processors (DSPs), Reduced Instruction-Set Computing (RISC), Complex Instruction-Set Computing (CISC), among other electronic components. However, it should be understood that the scope of the present invention is not limited to these examples.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

Many of the methods are described in their most basic form but operations can be added to or deleted from any of the methods and information can be added or subtracted from any of the described messages without departing from the basic scope of the present invention. Any number of variations of the inventive concept is anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A storage medium comprising content which, when executed by an accessing machine, causes the accessing machine to:
delay a request to transmit data retrieved from a solid state drive over a shared interface, the delay of the request allowing a host to access the shared interface and transmit a command over the shared interface to the solid state drive, the shared interface being a serial advanced technology attachment (SATA) interface.

2. The storage medium of claim 1, further comprising content which, when executed by an accessing machine, causes the accessing machine to detect whether the host lost to the solid state drive in an attempt to access the shared interface and to delay a subsequent request from the solid state drive for access to the interface.

3. The storage medium of claim 1, wherein the solid state drive comprises NAND Flash memory.

4. The storage medium of claim 1, further comprising content which, when executed by an accessing machine, causes the accessing machine to delay the request from the solid state drive for access to the shared interface for a time delay only if there are fewer than a threshold number of read results queued in a buffer associated with the solid state drive.

5. The storage medium of claim 1, further comprising content which, when executed by an accessing machine, causes the accessing machine to delay periodic requests from the solid state drive for access to the shared interface.

6. A system comprising:
a processor;
a network controller;
an interface host; and
a solid state drive, wherein the solid state drive includes an arbiter to delay a request for access to a shared interface from the solid state drive by a time delay, the time delay of delaying the request allowing a host computer to access the shared interface and transmit a command to the solid state drive.

7. The system of claim 6, further comprising the arbiter to detect whether the interface host lost to the solid state drive in an attempt to access the shared interface and to delay a subsequent request from the solid state drive for access to the interface.

8. The system of claim 7, wherein the interface comprises a serial advanced technology attachment (SATA) interface.

9. The system of claim 8, wherein the solid state drive comprises NAND Flash memory.

10. The system of claim 6, further comprising the arbiter to delay a request from the solid state drive for access to the shared interface for a time only if there are fewer than a threshold number of commands queued in the solid state drive.

11. The system of claim 6, further comprising the arbiter to delay periodic requests from the solid state drive for access to the interface.

12. A method comprising:
retrieving data from a solid state drive;
transmitting the retrieved data from the solid state drive over a shared interconnect to a host computer;
delaying, by a delay time, an attempt by the solid state drive to use the shared interface to transmit the retrieved data; and
during the delay time, receiving a command directed to the solid state drive over the shared interface from the host computer.

13. The method as in claim 12, wherein delaying the attempt by the solid state drive occurs in response to detecting a failed attempt by the host computer to access the shared interconnect.

14. The method as in claim 12 further comprising:
storing the retrieved data in a buffer; and
delaying the attempt by the delay time in response to detecting that an amount of retrieved data in the buffer to be transmitted to the host computer is below a threshold value.

15. The method as in claim 12, wherein the shared interconnect is a Serial Advanced Technology Attachment (SATA) interface.

16. The method as in claim 12 further comprising:
retrieving the data from the solid state drive in response to receiving a request over the shared interconnect from the host computer to access the data in the solid state drive.

17. The method as in claim 14 further comprising:
subsequent to expiration of the delay time, initiating access to the shared interface again to convey the retrieved data in the buffer to the host computer.

18. The method as in claim 15 further comprising:
retrieving the data from the solid state drive in response to a request received over the shared interface from the host computer to access the data, the request specifying a virtual address of data to be read from flash memory in the solid state drive;
storing the retrieved data in a buffer;
delaying the attempt by the delay time in response to: i) detecting that an amount of retrieved data in the buffer to be transmitted to the host computer falls below a threshold value, and ii) detecting a failed previous attempt by the host computer to access the shared interconnect and transmit the command to the solid state drive; and
subsequent to expiration of the delay time, initiating access to the shared interface again to convey the retrieved data in the buffer to the host computer.

19. A computer device including the system as in claim 6.

* * * * *